United States Patent
Kilpinen

(10) Patent No.: US 7,804,683 B2
(45) Date of Patent: Sep. 28, 2010

(54) ELECTRONIC DEVICE COMPONENT EJECT MECHANISM

(75) Inventor: Janne T. Kilpinen, Toijala (FI)

(73) Assignee: Nokia Corporation, Espoo (FI)

( * ) Notice: Subject to any disclaimer, the term of this patent is extended or adjusted under 35 U.S.C. 154(b) by 277 days.

(21) Appl. No.: 11/821,345

(22) Filed: Jun. 21, 2007

(65) Prior Publication Data

US 2008/0316684 A1 Dec. 25, 2008

(51) Int. Cl.
- *G06F 1/16* (2006.01)
- *H05K 5/00* (2006.01)
- *H05K 7/00* (2006.01)
- *H01R 13/62* (2006.01)

(52) U.S. Cl. .................. 361/679.38; 439/159
(58) Field of Classification Search ............ 361/679.37, 361/679.38; 455/575.1; 439/157–160, 152
See application file for complete search history.

(56) References Cited

U.S. PATENT DOCUMENTS

| | | | | |
|---|---|---|---|---|
| 4,070,081 A * | 1/1978 | Takahashi | ............... | 439/372 |
| 4,836,790 A * | 6/1989 | Narita | ............... | 439/68 |
| 5,057,029 A * | 10/1991 | Noorily | ............... | 439/160 |
| 5,147,211 A * | 9/1992 | Tondreault et al. | ............... | 439/160 |
| 5,197,894 A * | 3/1993 | Koike | ............... | 439/159 |
| 5,368,493 A * | 11/1994 | O'Brien et al. | ............... | 439/160 |
| 5,507,658 A * | 4/1996 | Ho | ............... | 361/157 |
| 5,622,510 A * | 4/1997 | Ishida | ............... | 439/160 |
| 5,683,258 A * | 11/1997 | Takano et al. | ............... | 439/159 |
| 5,793,607 A * | 8/1998 | Karidis et al. | ............... | 361/679.38 |
| 5,907,354 A * | 5/1999 | Cama et al. | ............... | 361/679.32 |
| 6,008,984 A * | 12/1999 | Cunningham et al. | ............... | 361/679.38 |
| 6,017,232 A * | 1/2000 | Tondreault et al. | ............... | 439/160 |
| 6,033,242 A * | 3/2000 | Oguchi et al. | ............... | 439/159 |
| 6,042,401 A * | 3/2000 | Oguchi et al. | ............... | 439/159 |
| 6,059,588 A * | 5/2000 | Tung et al. | ............... | 439/159 |
| 6,089,889 A * | 7/2000 | Chiou et al. | ............... | 439/159 |
| 6,210,188 B1 * | 4/2001 | Chang | ............... | 439/159 |
| 6,359,778 B1 * | 3/2002 | Wu | ............... | 361/679.33 |
| 6,540,523 B1 * | 4/2003 | Kung et al. | ............... | 439/61 |
| 6,587,350 B1 * | 7/2003 | Lin et al. | ............... | 361/754 |
| 6,667,879 B2 * | 12/2003 | Salinas et al. | ............... | 361/679.33 |
| 6,785,141 B2 * | 8/2004 | Fang | ............... | 361/727 |
| 6,954,653 B2 * | 10/2005 | Morita | ............... | 455/550.1 |
| 6,978,903 B2 * | 12/2005 | Son et al. | ............... | 211/26 |
| 6,991,480 B2 * | 1/2006 | Katayanagi et al. | ............... | 439/159 |
| 7,009,837 B2 * | 3/2006 | Lo | ............... | 361/679.33 |
| 7,029,297 B1 * | 4/2006 | Co et al. | ............... | 439/152 |
| 7,040,908 B2 * | 5/2006 | Kamata | ............... | 439/159 |
| 7,108,524 B2 * | 9/2006 | Wahler | ............... | 439/159 |
| 7,244,135 B2 * | 7/2007 | Chen et al. | ............... | 439/327 |
| 7,367,826 B2 * | 5/2008 | Wang et al. | ............... | 439/159 |
| 7,507,041 B2 * | 3/2009 | Ueda et al. | ............... | 361/737 |
| 2004/0092149 A1 * | 5/2004 | Scuteri et al. | ............... | 439/326 |
| 2006/0202659 A1 | 9/2006 | Nagano | | |

* cited by examiner

*Primary Examiner*—Jayprakash N Gandhi
*Assistant Examiner*—Adrian S Wilson
(74) *Attorney, Agent, or Firm*—Harrington & Smith

(57) ABSTRACT

Disclosed herein is a portable electronic device component eject mechanism. The portable electronic device component eject mechanism includes a first member and a second member. The first member is configured to contact a first portable electronic device component. The second member is movably connected to the first member. The second member is configured to release a second portable electronic device component when the second member is moved in a first direction. The first member is configured to eject the first component when the second member is moved in a second direction. The first component and the second component comprise a removable electronic module and a battery.

19 Claims, 6 Drawing Sheets

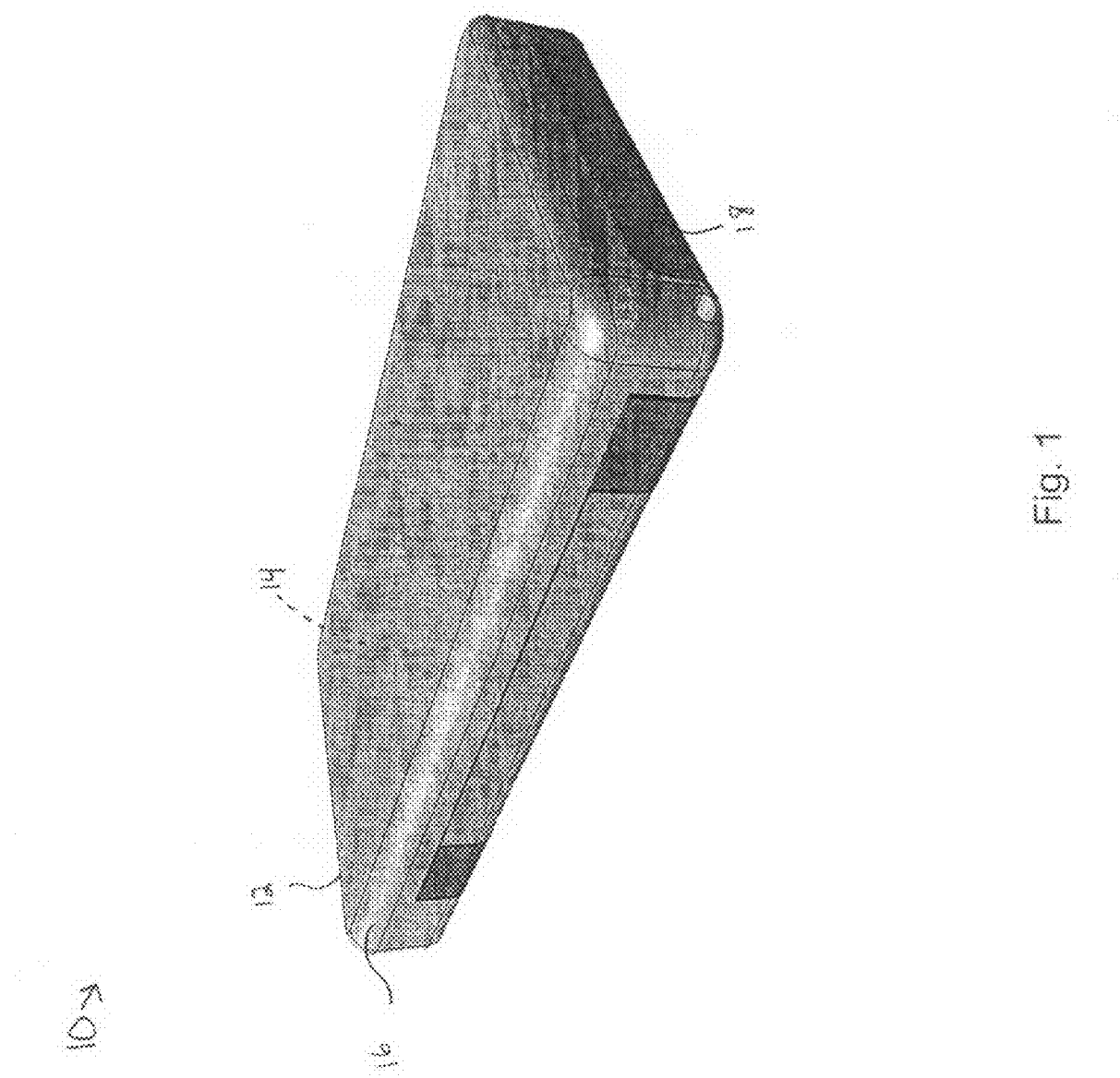

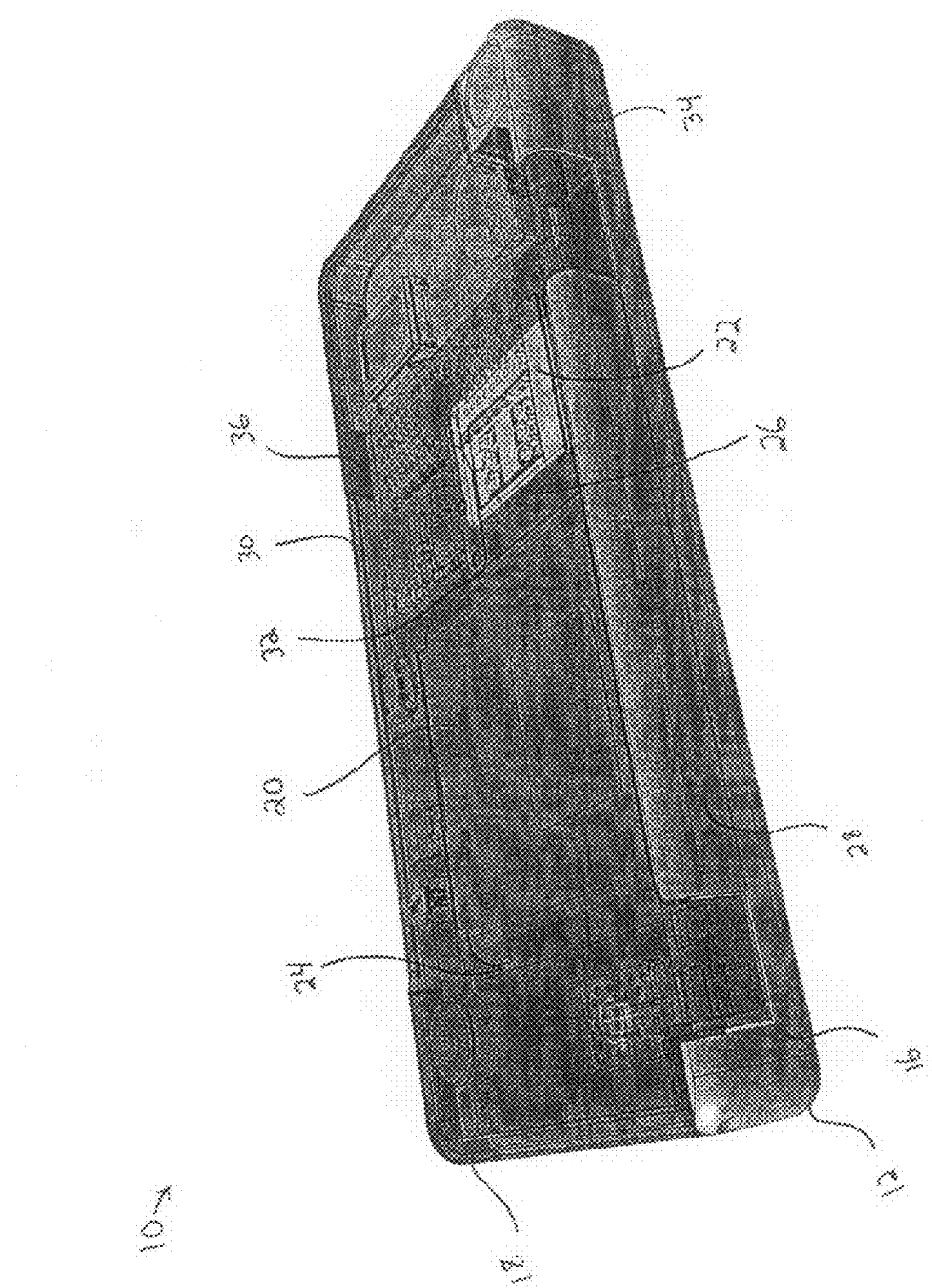

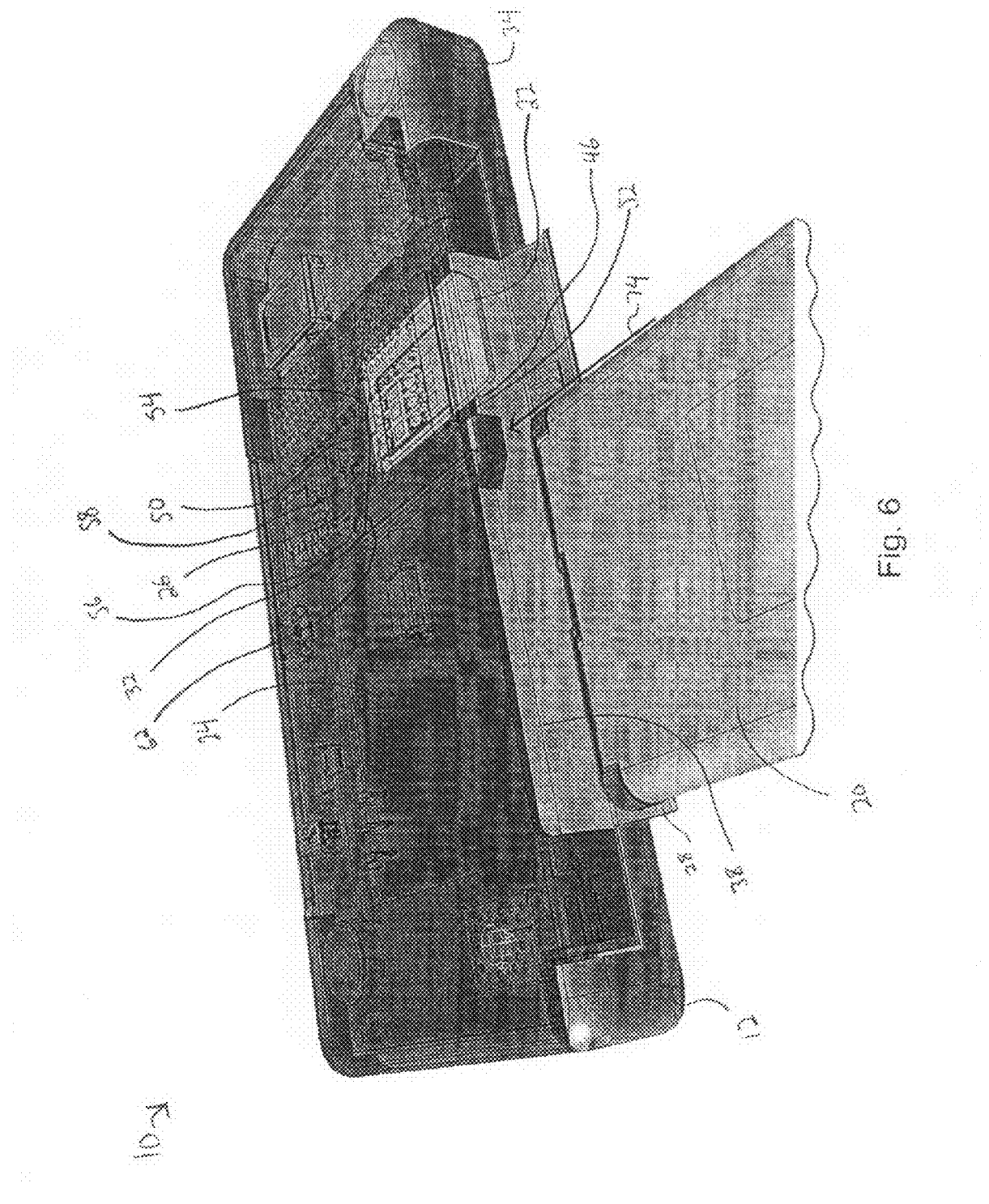

ELECTRONIC DEVICE COMPONENT EJECT MECHANISM

BACKGROUND OF THE INVENTION

1. Field of the Invention

The invention relates to an electronic device and, more particularly, to an electronic device component eject mechanism.

2. Brief Description of Prior Developments

Many electronic devices, such as mobile phones for example, have removable components such as a battery and a memory card, for example. U.S. Patent Application Publication No. 2006/0202659 discloses a conventional digital camera having separate mechanisms for releasing or ejecting the battery and the memory card.

A SIM (Subscriber Identity Module) card is one type of removable component widely used in mobile phones for identifying the mobile subscriber and for data storage. In many conventional mobile phones, there is a dedicated hatch for the battery on the back side of the mobile phone. The SIM card is frequently placed under or beside the battery, so that the user has to remove the battery first to be able to remove the SIM card. This way it is mechanically impossible to remove the SIM card while power is on. To ensure there is enough voltage to finish writing on the SIM card after the battery is removed, there is a capacitor on the device. If the SIM card is removed while writing data on it, there is a risk that the SIM card data gets corrupted and cannot be used anymore. There might be valuable data like phonebook contacts lost. This is very inconvenient for the user.

As consumers demand increased functionality from electronic devices, there is a need to provide improved devices having increased capabilities (and thus increased component capacity and/or size) while maintaining robust and reliable product configurations. Additionally, due to the demand for miniaturized devices, the increased capabilities should be provided in a compact yet user-friendly design.

Accordingly, there is a desire to provide an improved electronic device component eject mechanism.

SUMMARY OF THE INVENTION

In accordance with one aspect of the invention, a portable electronic device component eject mechanism is disclosed. The portable electronic device component eject mechanism includes a first member and a second member. The first member is configured to contact a first portable electronic device component. The second member is movably connected to the first member. The second member is configured to release a second portable electronic device component when the second member is moved in a first direction. The first member is configured to eject the first component when the second member is moved in a second direction. The first component and the second component comprise a removable electronic module and a battery.

In accordance with another aspect of the invention, a portable electronic device is disclosed. The portable electronic device includes a housing, electronic circuitry, a first member, and a second member. The electronic circuitry is mounted in the housing. The first member is movably mounted within the housing. The first member is configured to contact a removable electronic module. The second member is movably connected to the first member. The second member is configured to contact a battery.

In accordance with another aspect of the invention, a method of manufacturing a portable electronic device is disclosed. A housing is provided. Electronic circuitry is installed within the housing. A first member is mounted within the housing. The first member is configured to contact a removable electronic module. A second member is connected to the first member. The second member is configured to contact a battery.

In accordance with another aspect of the invention, a method of removing a removable electronic module from a portable electronic device is disclosed. A lever member is moved away from contact with a battery of the portable electronic device. The battery is removed from the portable electronic device. The lever member is pushed in a battery insertion direction. A first member is rotated to exert a force on the removable electronic module.

BRIEF DESCRIPTION OF THE DRAWINGS

The foregoing aspects and other features of the invention are explained in the following description, taken in connection with the accompanying drawings, wherein.

DETAILED DESCRIPTION OF THE PREFERRED EMBODIMENT

Figure 1:
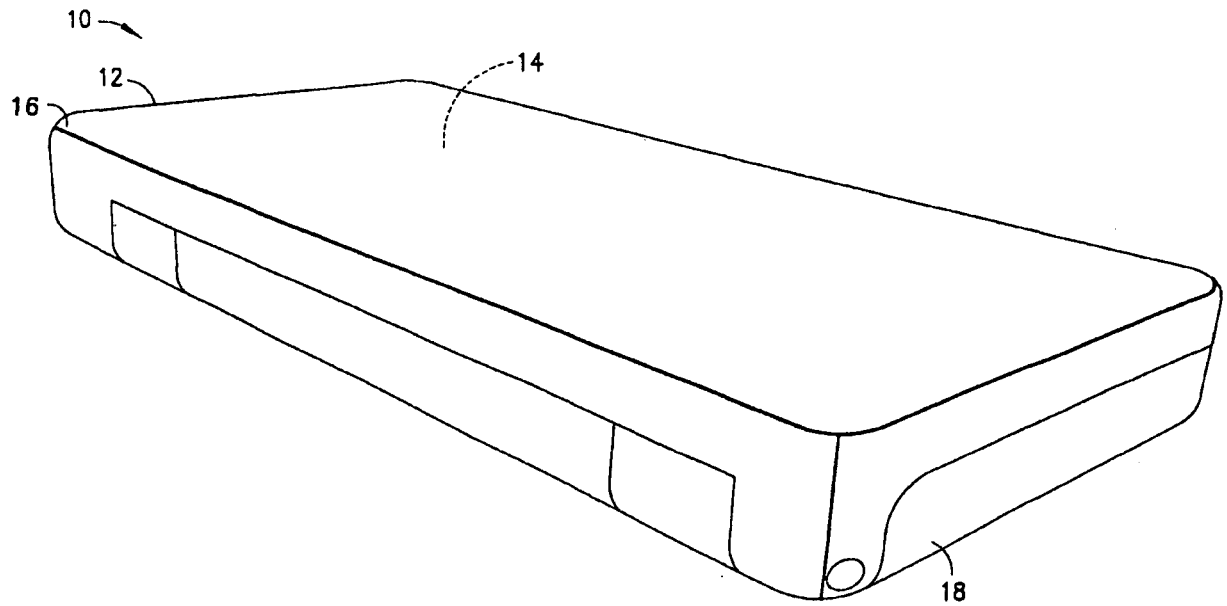
FIG. 1 is a perspective view of a portable electronic device comprising features of the invention.

Referring to FIG. 1, there is shown a perspective view of a portable electronic device 10 incorporating features of the invention. Although the invention will be described with reference to the exemplary embodiment shown in the drawings, it should be understood that the invention can be embodied in many alternate forms of embodiments. In addition, any suitable size, shape or type of elements or materials could be used.

In the exemplary embodiment shown in FIG. 1, the device 10 comprises a mobile telephone. However, in alternate embodiments the device could comprise any suitable type of hand-held portable electronic device such as a gaming device, or a PDA, for example. In addition, as is known in the art, the telephone 10 can include other features or applications such as a camera, a music player, a game player, or an Internet browser, for example. The telephone 10 generally comprises a housing 12 and electronic circuitry 14. The electronic circuitry 14 includes, for example, a transceiver, a controller such as a microprocessor, a memory, etc. The housing 12 includes a first housing section 16 and a second housing section 18. In alternate embodiments more than two housing sections could be provided.

Figure 2:
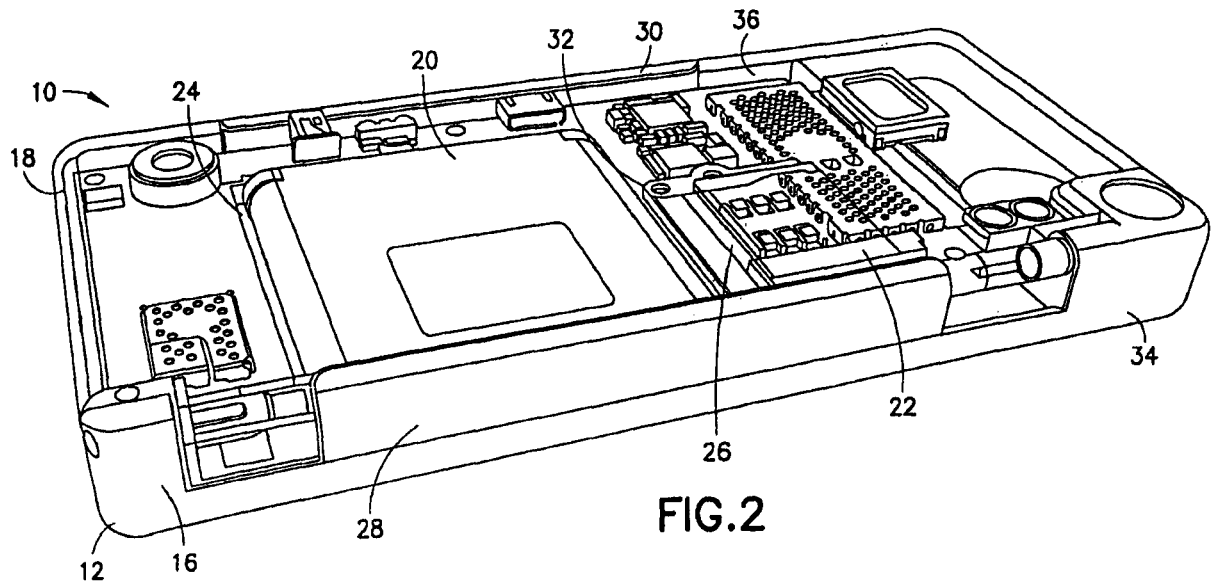
FIG. 2 is a perspective view of a bottom side of the device of FIG. 1, wherein a second housing section is transparent.
Figure 3:
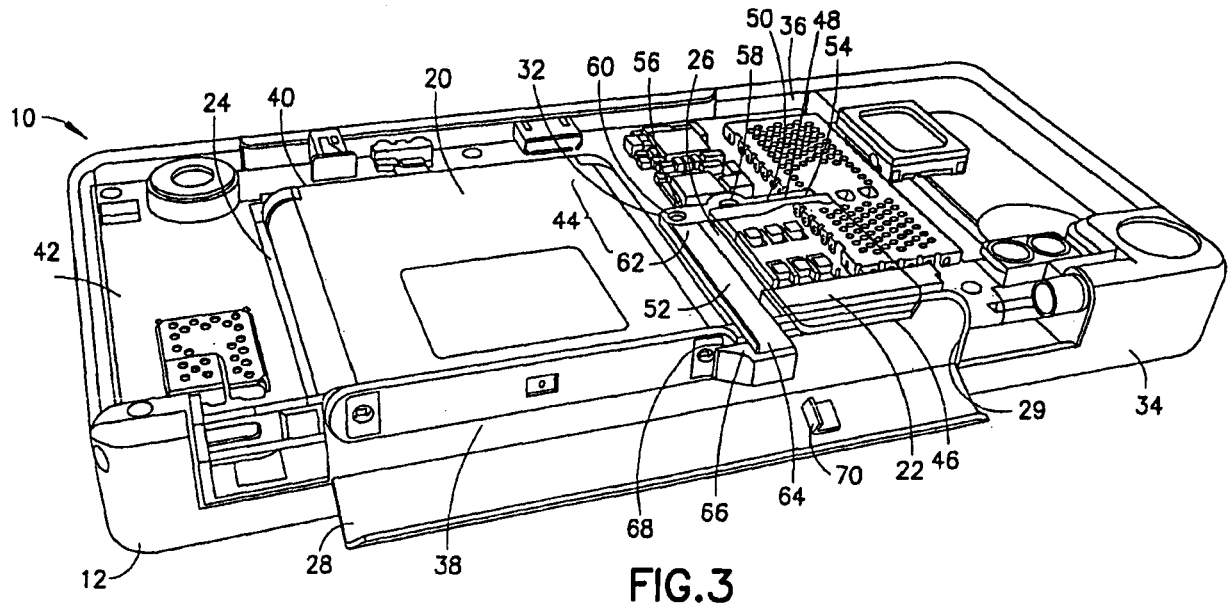
Figure 4:
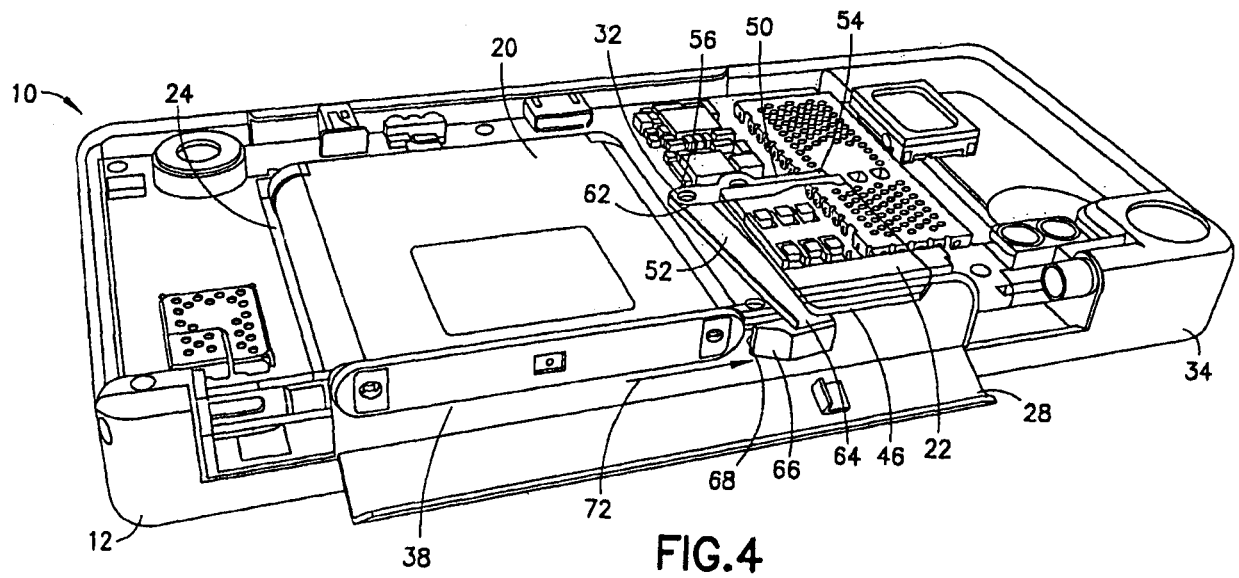
Figure 5:
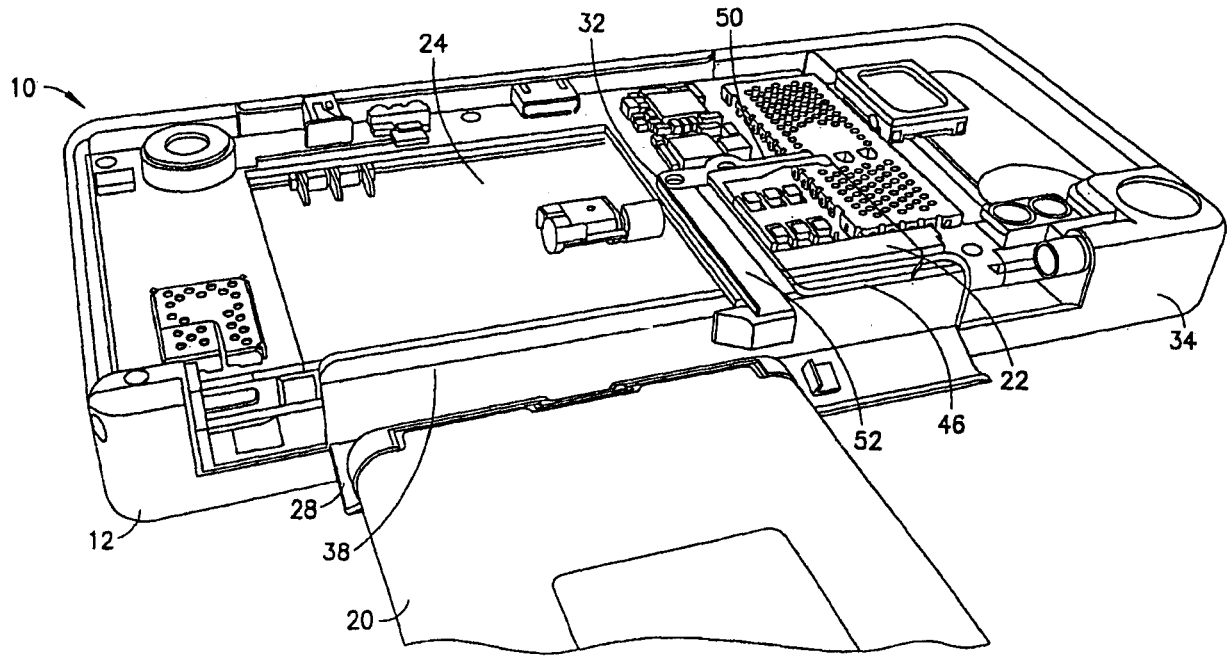
Figure 6:
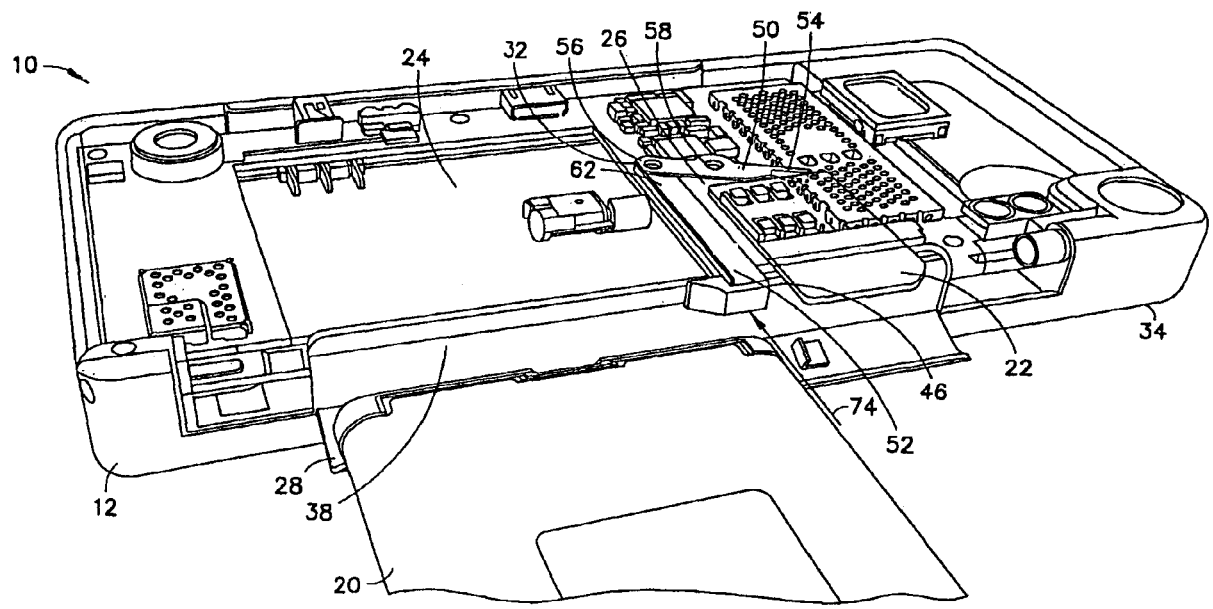
FIG. 6 is a perspective view of the bottom side of the device as in FIG. 5, wherein the second member of the eject mechanism is in a third position, and wherein a SIM card is ejected.

FIG. 2 illustrates a bottom side perspective view of the device 10. It should be noted that, for the sake of clarity, the second housing section 18 is shown transparent in FIGS. 2-6.

The device 10 further comprises portable electronic device components 20, 22, receiving areas 24, 26 for the portable electronic device components 20, 22, side hatches 28, 30, and a portable electronic device component eject mechanism 32.

As shown in FIGS. 2-6, the portable electronic device component 20 is a battery and the portable electronic device component 22 is a removable electronic module. However, it should be noted that in alternate embodiments, any combination of portable electronic device components may be provided.

The battery 20 is disposed within the battery receiving area 24 of the portable electronic device 10. The battery receiving area 24 extends between a first lateral side 34 and a second lateral side 36 of the portable electronic device 10. The battery receiving area 24 comprises a generally rectangular shape. An open end 38 (best shown in FIGS. 3-6) of the battery receiving area 24 is proximate the first lateral side 34. The open end 38 is accessible from the first side hatch 28. The first side hatch is disposed at a first lateral side opening 29 of the housing 12. It is to be noted that although the figures illustrate the first side hatch 28 at the opening 29 between the first housing section 16 and the second housing section 18, alternate embodiments may provide the first side hatch 28 at any suitable device location. The first side hatch 28 may be attached to the housing 12 by a snap fit connection or hinged connection for example. However, in alternate embodiments any suitable means for connecting the first side hatch 28 to the housing 12 could be provided. A closed end 40 of the battery receiving area 24 is proximate the second lateral side 36. The battery 20 is configured to be insertable into (or removable from) the battery receiving area 24 through the open end 38 in a direction substantially perpendicular to the first lateral side 34. It should be noted that although the figures illustrate the battery receiving area 24 as extending across a majority of a bottom side 42 of the electronic device 10, alternate embodiments may provide a battery receiving area comprising any suitable size, shape, or location for receiving the battery 20.

The removable electronic module 22 is disposed within the removable electronic module receiving area 26 of the portable electronic device 10. The removable electronic module receiving area 26 extends between the first lateral side 34 and a middle portion 44 of the portable electronic device 10. The removable electronic module receiving area 26 comprises a generally rectangular shape. An open end 46 (best shown in FIGS. 3-6) of the removable electronic module receiving area 26 is proximate the first lateral side 34. The open end 46 is accessible from the first side hatch 28. A closed end 48 of the removable electronic module receiving area 26 is proximate the middle portion 44. The removable electronic module receiving area 26 is disposed adjacent to the battery receiving area 24. Similar to the battery 20, the removable electronic module 22 is configured to be insertable into (or removable from) the removable electronic module receiving area 26 through the open end 46 in a direction substantially perpendicular to the first lateral side 34. It should be noted that although the figures illustrate the removable electronic module receiving area 26 as extending across the bottom side 42 of the electronic device 10, alternate embodiments may provide a removable electronic module receiving area comprising any suitable size, shape, or location for receiving the removable electronic module 22. Additionally, it is to be noted that the removable electronic module 22 may be a Subscriber Identity Module (SIM) card, a memory card/module, a multimedia card (MMC), or a smart card for example. However in alternate embodiments, the removable electronic module 22 may be any type of integrated circuit card or removable storage device.

The electronic device component eject mechanism 32 comprises a first member 50 and a second member 52. The electronic device component eject mechanism 32 is disposed within the housing 12 between the electronic module 22 and the battery 20. The first member 50 is configured to contact the removable electronic module 22. The second member 52 is configured to contact the battery 20.

The first member 50 comprises a first end 54 and a second end 56. The first member 50 is configured to be pivotably mounted within the housing 10 at a first opening 58 between the first end 54 and the second end 56. The first member 50 is mounted at the middle portion 44 of the housing 10. The first member 50 is aligned substantially parallel with a length of the device 10. The first member 50 may be mounted (within the housing 10) at the first opening 58 by any suitable fastening means which allows for rotation. The first opening 58 is used as a fulcrum allowing rotation, or pivoting, of the first member 50 within the housing 10. It is to be understood that although the figures illustrate the first opening 58 as providing a fulcrum for the first member 50, any suitable feature allowing for rotation or pivoting may be provided. The first end 54 is configured to contact the removable electronic module 22. However, in alternate embodiments, any suitable portion of the first member 50 may be configured to contact the removable electronic module 22. Additionally, the first end 54 may comprise a narrowed portion configured to contact an end portion of the removable electronic module 22 upon rotation of the first member 50. The second end 56 comprises a second opening 60 configured to be aligned with the second member 52.

The second member 52 is disposed within the housing 10 between the battery receiving area 24 and the removable electronic module receiving area 26. The second member 52 is aligned substantially perpendicular with a length of the device 10. The second member 52 comprises a connecting end 62 and a contact end 64. The connecting end 62 is configured to be pivotably connected to the second end 56 of the first member 50 (at the second opening 60). The connecting end 62 may be pivotably connected to the first member 50 by any suitable connection allowing for pivoting, or rotation, between the first member 50 and the second member 52. However, it should be noted that in an alternate embodiment, the second member 52 may engage the first member 50 via any other suitable connection, such as a sliding contact connection, for example. The contact end 64 of the second member 52 comprises a latch portion 66. The contact end 64 is proximate the first lateral side 34 and is accessible from the first side hatch 28. The latch portion 66 extends from the contact end 64 and forms a battery contact surface 68. The battery contact surface 68 is configured to contact a front face of the battery 20. However, it should be noted that alternate embodiments may comprise a latch portion configured to contact the battery 20 at any suitable location. Additionally, the first side hatch 28 may comprise a stop feature 70 configured to maintain the position of the second member 52 when the device 10 is in use.

In conventional configurations, the battery is traditionally used to prevent ejection of the SIM card in mobile phones so that the SIM card cannot be removed without turning the device off first. If the SIM card is removed while writing data on it, there is a risk that the SIM card data gets corrupted and cannot be used anymore. There might be valuable data like phonebook contacts lost.

The disclosed mechanism 32 enables the removal of the battery 20 and the removable electronic module or SIM card 22 from the mobile phone 10 in a desired sequence. The mechanism 32 maintains the battery 20 in electrical contact with the device 10 and prevents the battery 20 from dropping out of the battery receiving area 24. And while in this position, the battery 20 restricts the movement of the mechanism 32. When the mechanism 32 is displaced, the battery 20 can be removed. In the preferred embodiment, after the battery 20 is removed, it is only then possible to move the mechanism 32 in another direction, which actuates the removal of the SIM card 22.

Figure 3:
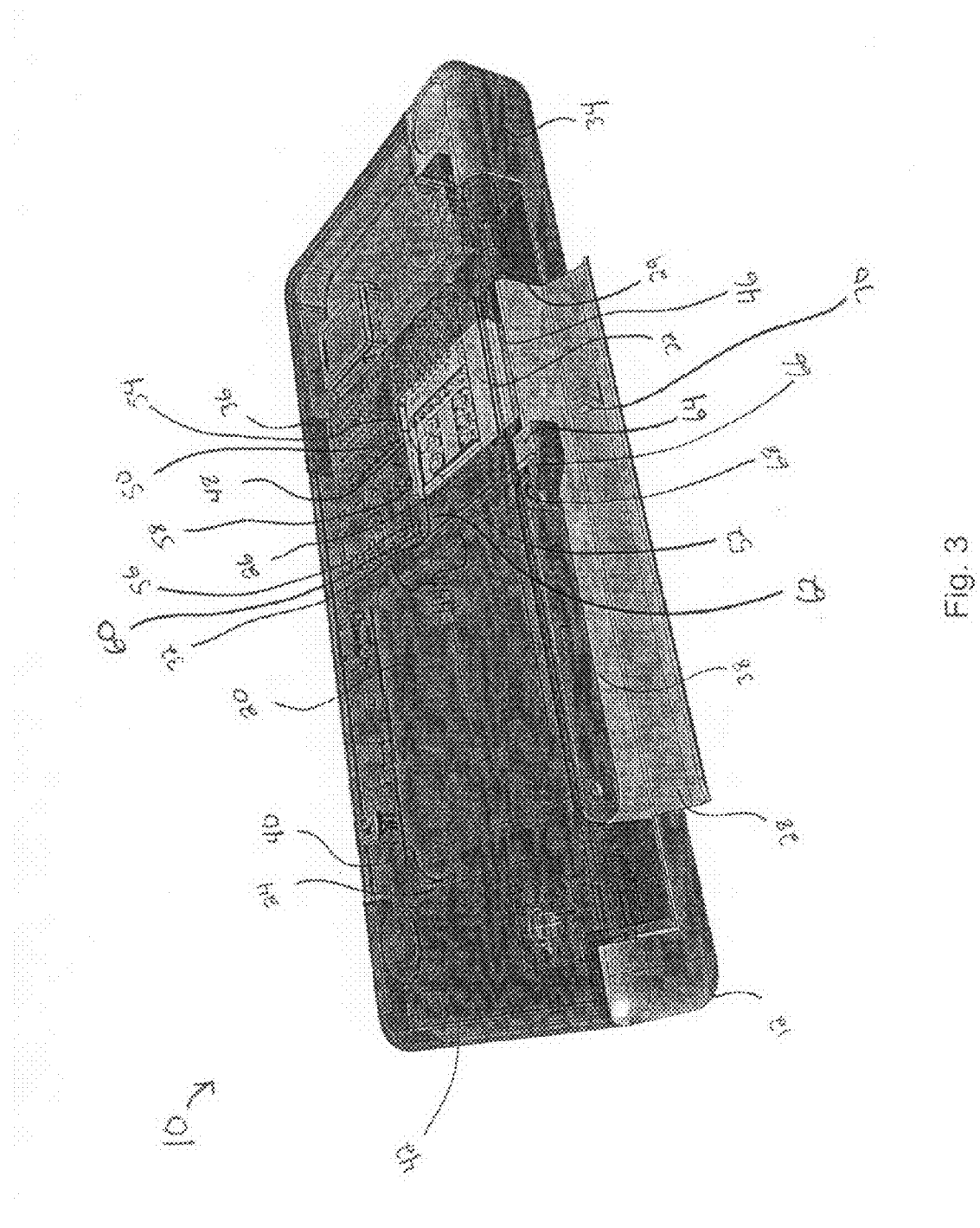
FIG. 3 is a perspective view of the bottom side of the device as in FIG. 2, wherein a side hatch is open.
Figure 4:
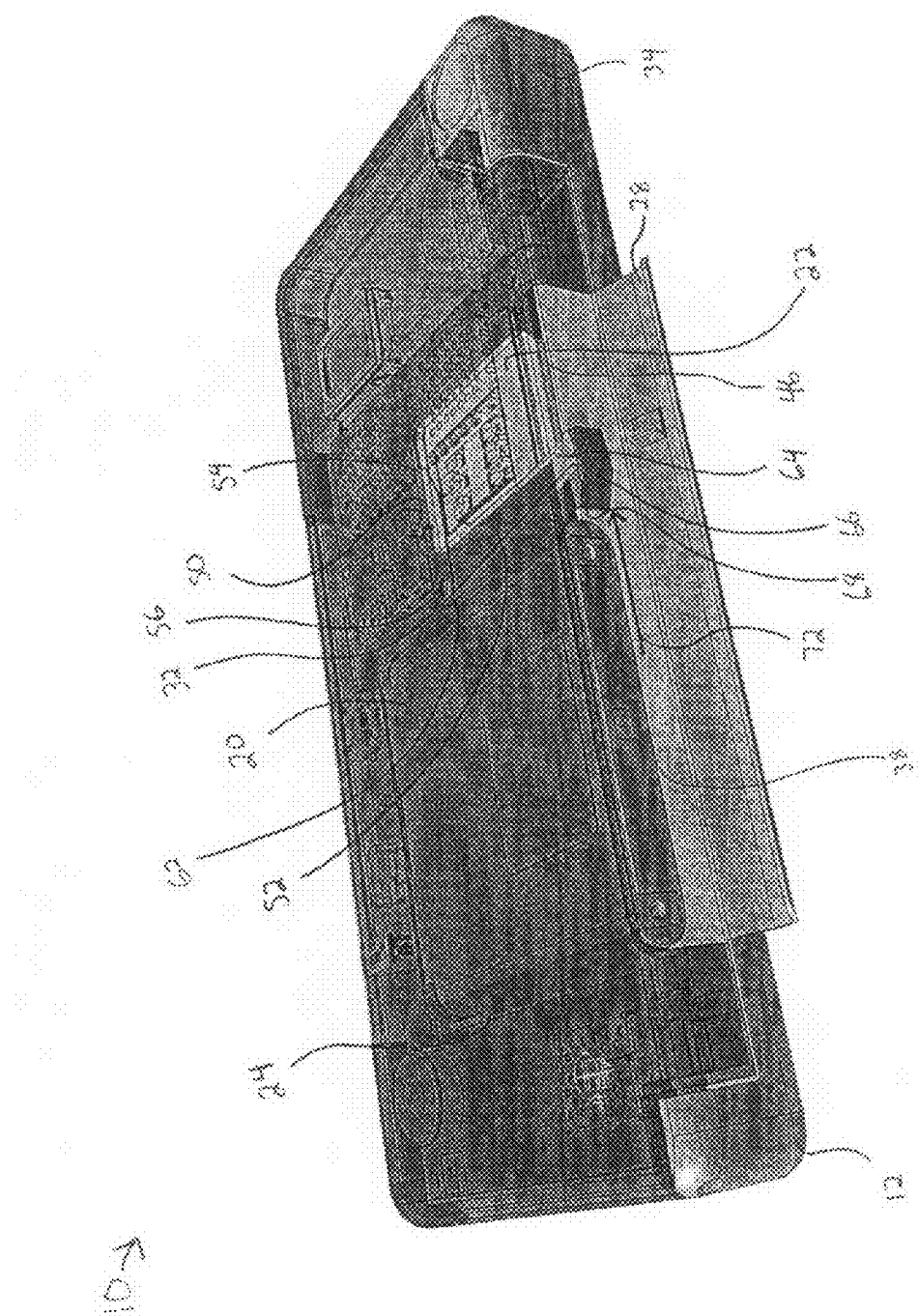
FIG. 4 is a perspective view of the bottom side of the device as in FIG. 3, wherein a second member of an eject mechanism is in a second position.

The second member 52 is pivotable between a first position (shown in FIGS. 2, 3, and 5) and a second position (shown in FIG. 4). When the second member 52 is in the first position, the first member 50 and the second member 52 are aligned in a substantial right angle orientation. To release (or eject) the battery 20, the second member or lever 52 is pushed away from contact with the battery 20 (and towards the SIM card 22) in a direction substantially perpendicular to the direction of battery and SIM card insertion (or first direction 72). This movement pivots the second member 52 about the second end 56 of the first member 50 and removes the latch portion 66 from contact with the battery 20 (see FIG. 4). With the second member 52 in the second position, the first member 50 and the second member 52 are aligned in a substantial acute angle orientation. This releases the spring-actuated battery 20. The battery 20 can now be removed from the battery receiving area 24. However, it should be noted that in an alternate embodiment, a spring-actuated battery 20 is not necessary and the movement of the second member 52 from the first position to the second position may activate software and/or electrical/mechanical devices to release the battery 20.

Figure 5:
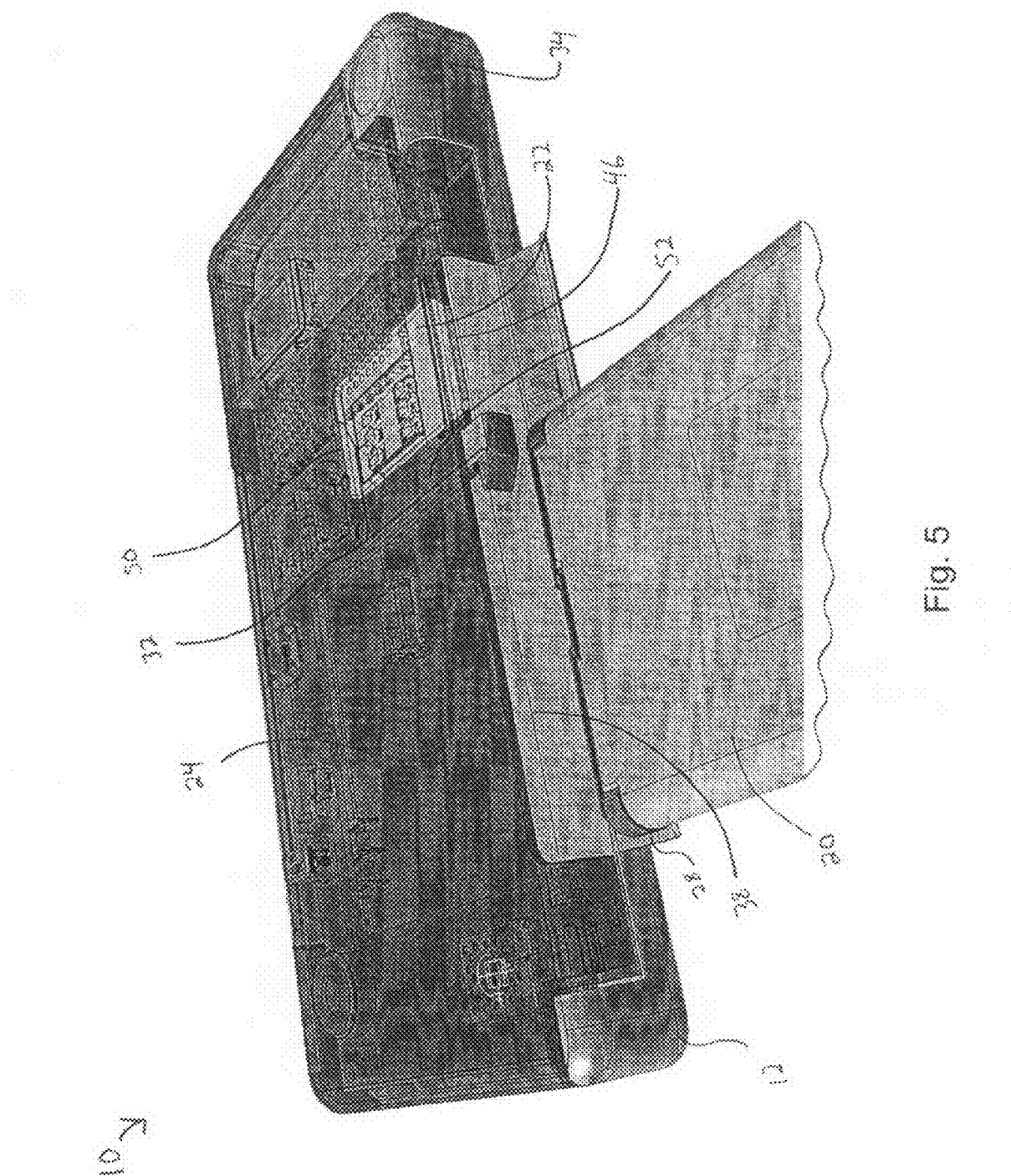
FIG. 5 is a perspective view of the bottom side of the device as in FIG. 3, wherein the a battery is removed.

After the battery 20 is removed, the second member 52 is returned to the first position (see FIG. 5). To eject the SIM card 22, the second member 52 is then pushed inwards in the direction of battery 20 (and SIM card 22) insertion (or second direction 74) to a third position (shown in FIG. 6). When the second member 52 is in the third position, the first member 50 and the second member 52 are aligned in a substantial acute angle orientation. This applies a force on the second end 56 of the first member 50 to rotate the first member 50 about the first opening 58. The rotation, or pivoting, of the first member 50 allows the first end 54 to contact the SIM card 22 and eject the SIM card 22 from the receiving area 26. It should be noted that in an alternate embodiment, the second member 52 may be pushed inwards, to apply a force on the first member 50, without returning the second member 52 to the first position.

The disclosed eject mechanism 32 provides a novel mechanism for holding the battery 20 and the SIM card 22 in the device 10 while preventing SIM card 22 removal prior to disconnection of the battery 20. One of the advantages of the disclosed mechanism 32 is that a single mechanism 32 is used to hold the battery 20 in place and push SIM card 22 out. The same lever 52 that is used to push SIM card 22 out of the device 10, holds battery 20 in its place. The battery 20 also prevents the use of the lever 52 to push SIM card 22 out. This is achieved by the orientation of the latch portion 66. When the battery 20 is in place, the latch portion 66 prevents movement of the second member 52 in the second direction 74 as it would be blocked by the battery 20. However, it should be noted that alternate embodiments may comprise second member and latch portion configurations suitable for any desired ejection sequence. Additionally, after the lever or lever member 52 releases the battery 20 out of the device 10, the same lever 52 can then be used to push out (or eject) the SIM card 22. Thus the mechanism 32 requires little space and allows access to the battery 20 and the SIM card 22 from the side of the device (via the opened/removed first side hatch 28) instead of traditional bottom side access locations as in conventional configurations.

Another advantage of the disclosed mechanism 32 is that the side hatches 28, 30 allow for rigid and robust construction of the device housing 12. As mentioned above, conventional configurations having bottom side battery and SIM card access locations require a large battery cover. The conventional large battery cover, and corresponding large housing opening, has to be large enough to allow removal of the battery. This large opening may result in a weakened housing. Therefore, with the disclosed mechanism 32, the battery 20 and the SIM card 22 are inserted and removed along the first lateral side 34 of the device 10. Therefore, only a small hatch 28 may be provided (instead of a large battery cover). Consequently, there is no need for a massive opening at the back of the device. This enables for a more rigid construction of the device housing 12. Furthermore, the rigid construction of the housing 12 allows for the accommodation of the second side hatch 30 which may provide access to device connections such as a USB connection, a battery charger connection, or a memory card connection, for example.

While the disclosed embodiment has been described in connection with a battery 20 and a SIM card 22, one skilled in the art will appreciate that the invention is not necessarily so limited and that the eject mechanism 32 may be configured for use with any combination of portable electronic device components.

In the exemplary embodiment illustrated in the figures, the device 10 is a one-part or "block style" device. Wherein the first housing section 16 and the second housing section 18 form the housing 12 of the one-part or "block" style device. In another embodiment, the device 10 could be a "flip", "slide", or "internet tablet" style device. In yet another alternate embodiment, the device 10 could be a two-part or multi-part device, such as a NOKIA® Communicator™ device for example. Additionally, features of the disclosed eject mechanism 32 could be used in any other suitable type of portable electronic device.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. An apparatus comprising:
a first member configured to contact a first portable electronic device component, wherein the first member comprises a first end and a second end, and wherein the first member is configured to contact the first component at the first end; and
a second member movably connected to the first member at the second end of the first member, wherein the second member is configured to release a second portable electronic device component when the second member is moved in a first direction, wherein the second member comprises a contact end and a connecting end, wherein the second member is movably connected to the first member at the connecting end, wherein the contact end is configured to contact the second component, wherein the first member is configured to eject the first component when the second member is moved in a second direction, and wherein the first component and the second component comprise a removable electronic module and a battery.

2. The apparatus of claim 1 wherein the first member is configured to be pivotably mounted within a housing between the first end and the second end.

3. The apparatus of claim 1 wherein the second member is pivotably connected to the first member.

4. The apparatus of claim 1 wherein the second member comprises a latch portion at the contact end.

5. A portable electronic device comprising:
a housing;
electronic circuitry mounted within the housing; and
an apparatus as in claim 1 mounted within the housing.

6. An apparatus comprising:
a housing;
electronic circuitry mounted in the housing;
a first member movably mounted within the housing, wherein the first member comprises a first end and a second end, wherein the first member is configured to contact a removable electronic module at the first end; and
a second member comprising a contact end and a connecting end, wherein the second member is movably connected to the second end of the first member at the connecting end, and wherein the contact end is configured to contact a battery.

7. The apparatus of claim 6 wherein the apparatus further comprises a battery receiving area and a removable electronic module receiving area, and wherein the second member is between the battery receiving area and the removable electronic module receiving area.

8. The apparatus of claim 7 wherein open ends of the battery receiving area and the removable electronic module receiving area are proximate a lateral side of the apparatus.

9. The apparatus of claim 7 wherein the housing comprises a hatch along a lateral side of the housing, and wherein the hatch is configured to allow access to the battery receiving area and the removable electronic module receiving area.

10. The apparatus of claim 9 wherein an end of the second member is proximate the hatch.

11. The apparatus of claim 6 wherein the second member is configured to be movable in a direction of battery insertion.

12. The apparatus of claim 6 wherein the removable electronic module is a memory card.

13. A method comprising:
providing a housing;
installing electronic circuitry within the housing;
mounting a first member within the housing, wherein the first member comprises a first end and a second end, wherein the first member is configured to contact a removable electronic module at the first end; and
connecting a second member to the second end of the first member, wherein the second member comprises a contact end and a connecting end, wherein the second member is connected to the second end of the first member at the connecting end, and wherein the contact end is configured to contact a battery.

14. The method of claim 13 wherein the mounting of the first member within the housing further comprises pivotably mounting the first member within the housing.

15. The method of claim 13 wherein the connecting of the second member to the first member further comprises pivotably connecting the second member to the first member.

16. A method comprising:
moving a lever member away from contact with a battery of a portable electronic device, wherein the lever member comprises a contact end and a connecting end, and wherein the moving of the lever member comprises moving the contact end away from contact with the battery;
removing the battery from the portable electronic device;
pushing the lever member in a battery insertion direction; and
rotating a first member to exert a force on a removable electronic module, wherein the first member comprises a first end and a second end, wherein the first member is configured to contact the removable electronic module at the first end, and wherein the connecting end of the lever member is movably connected to the first member at the second end.

17. The method of claim 16 wherein the moving of the lever member further comprises rotating the lever member away from contact with the battery of the portable electronic device.

18. The method of claim 16 wherein the rotating of the first member further comprises pivotably rotating the first member.

19. The apparatus of claim 1 wherein the second member is configured to be located between lateral sides of the first component and the second component.

* * * * *

UNITED STATES PATENT AND TRADEMARK OFFICE
CERTIFICATE OF CORRECTION

PATENT NO.        : 7,804,683 B2
APPLICATION NO. : 11/821345
DATED             : September 28, 2010
INVENTOR(S)      : Janne T. Kilpinen It is certified that error appears in the above-identified patent and that said Letters Patent is hereby corrected as shown below:

On the title page, Fig. 3 should be deleted and replace with Fig. 3, as shown on the attached page.

Drawings: Figs. 1-6 should be deleted and replace with Figs. 1-6 as shown on the attached pages.

Signed and Sealed this

Twenty-third Day of November, 2010

David J. Kappos
*Director of the United States Patent and Trademark Office*

CERTIFICATE OF CORRECTION (continued)

(12) United States Patent
Kilpinen

(10) Patent No.: US 7,804,683 B2
(45) Date of Patent: Sep. 28, 2010

(54) ELECTRONIC DEVICE COMPONENT EJECT MECHANISM

(75) Inventor: Janne T. Kilpinen, Toijala (FI)

(73) Assignee: Nokia Corporation, Espoo (FI)

(*) Notice: Subject to any disclaimer, the term of this patent is extended or adjusted under 35 U.S.C. 154(b) by 277 days.

(21) Appl. No.: 11/821,345

(22) Filed: Jun. 21, 2007

(65) Prior Publication Data
US 2008/0316684 A1    Dec. 25, 2008

(51) Int. Cl.
G06F 1/16 (2006.01)
H05K 5/00 (2006.01)
H05K 7/00 (2006.01)
H01R 13/62 (2006.01)

(52) U.S. Cl. .................. 361/679.38; 439/159

(58) Field of Classification Search ............ 361/679.37, 361/679.38; 455/575.1; 439/157–160, 152
See application file for complete search history.

(56) References Cited

U.S. PATENT DOCUMENTS

| | | | |
|---|---|---|---|
| 4,070,081 A * | 1/1978 | Takahashi | 439/372 |
| 4,836,790 A * | 6/1989 | Narita | 439/68 |
| 5,057,029 A * | 10/1991 | Noorily | 439/160 |
| 5,147,211 A * | 9/1992 | Tondreault et al. | 439/160 |
| 5,197,894 A * | 3/1993 | Koike | 439/159 |
| 5,368,493 A * | 11/1994 | O'Brien et al. | 439/160 |
| 5,507,658 A * | 4/1996 | Ho | 361/157 |
| 5,622,510 A * | 4/1997 | Ishida | 439/160 |
| 5,683,258 A * | 11/1997 | Takano et al. | 439/159 |
| 5,793,607 A * | 8/1998 | Karidis et al. | 361/679.38 |
| 5,907,354 A * | 5/1999 | Cama et al. | 361/679.32 |
| 6,008,984 A * | 12/1999 | Cunningham et al. | 361/679.38 |
| 6,017,232 A * | 1/2000 | Tondreault et al. | 439/160 |
| 6,033,242 A * | 3/2000 | Oguchi et al. | 439/159 |
| 6,042,401 A * | 3/2000 | Oguchi et al. | 439/159 |
| 6,059,588 A * | 5/2000 | Tung et al. | 439/159 |
| 6,089,889 A * | 7/2000 | Chiou et al. | 439/159 |
| 6,210,188 B1 * | 4/2001 | Chang | 439/159 |
| 6,359,778 B1 * | 3/2002 | Wu | 361/679.33 |
| 6,540,523 B1 * | 4/2003 | Kung et al. | 439/61 |
| 6,587,350 B1 * | 7/2003 | Lin et al. | 361/754 |
| 6,667,879 B2 * | 12/2003 | Salinas et al. | 361/679.33 |
| 6,785,141 B2 * | 8/2004 | Fang | 361/727 |
| 6,954,653 B2 * | 10/2005 | Morita | 455/550.1 |
| 6,978,903 B2 * | 12/2005 | Son et al. | 211/26 |
| 6,991,480 B2 * | 1/2006 | Katayanagi et al. | 439/159 |
| 7,009,837 B2 * | 3/2006 | Lo | 361/679.33 |
| 7,029,297 B1 * | 4/2006 | Co et al. | 439/152 |
| 7,040,908 B2 * | 5/2006 | Kamata | 439/159 |
| 7,108,524 B2 * | 9/2006 | Wahler | 439/159 |
| 7,244,135 B2 * | 7/2007 | Chen et al. | 439/327 |
| 7,367,826 B2 * | 5/2008 | Wang et al. | 439/159 |
| 7,507,041 B2 * | 3/2009 | Ueda et al. | 361/737 |
| 2004/0092149 A1 * | 5/2004 | Scuteri et al. | 439/326 |
| 2006/0202659 A1 | 9/2006 | Nagano | |

* cited by examiner

*Primary Examiner*—Jayprakash N Gandhi
*Assistant Examiner*—Adrian S Wilson
(74) *Attorney, Agent, or Firm*—Harrington & Smith

(57) ABSTRACT

Disclosed herein is a portable electronic device component eject mechanism. The portable electronic device component eject mechanism includes a first member and a second member. The first member is configured to contact a first portable electronic device component. The second member is movably connected to the first member. The second member is configured to release a second portable electronic device component when the second member is moved in a first direction. The first member is configured to eject the first component when the second member is moved in a second direction. The first component and the second component comprise a removable electronic module and a battery.

19 Claims, 6 Drawing Sheets

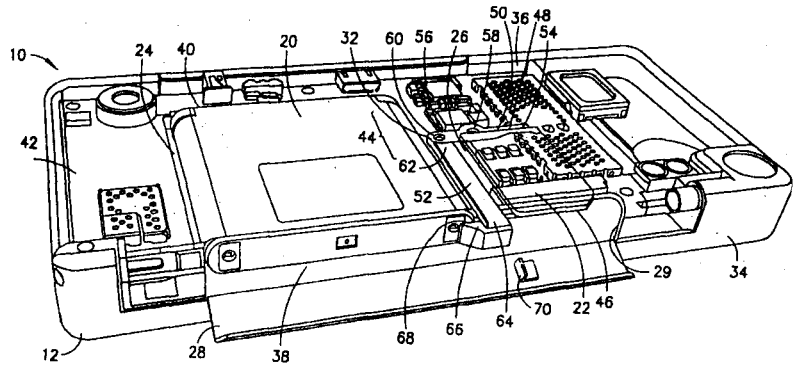

Please replace Formal Drawing 1 as shown below.

Please replace Formal Drawing 2 as shown below.

Please replace Formal Drawing 3 as shown below.

Please replace Formal Drawing 4 as shown below.

Please replace Formal Drawing 5 as shown below.

Please replace Formal Drawing 6 as shown below.